UNITED STATES PATENT OFFICE.

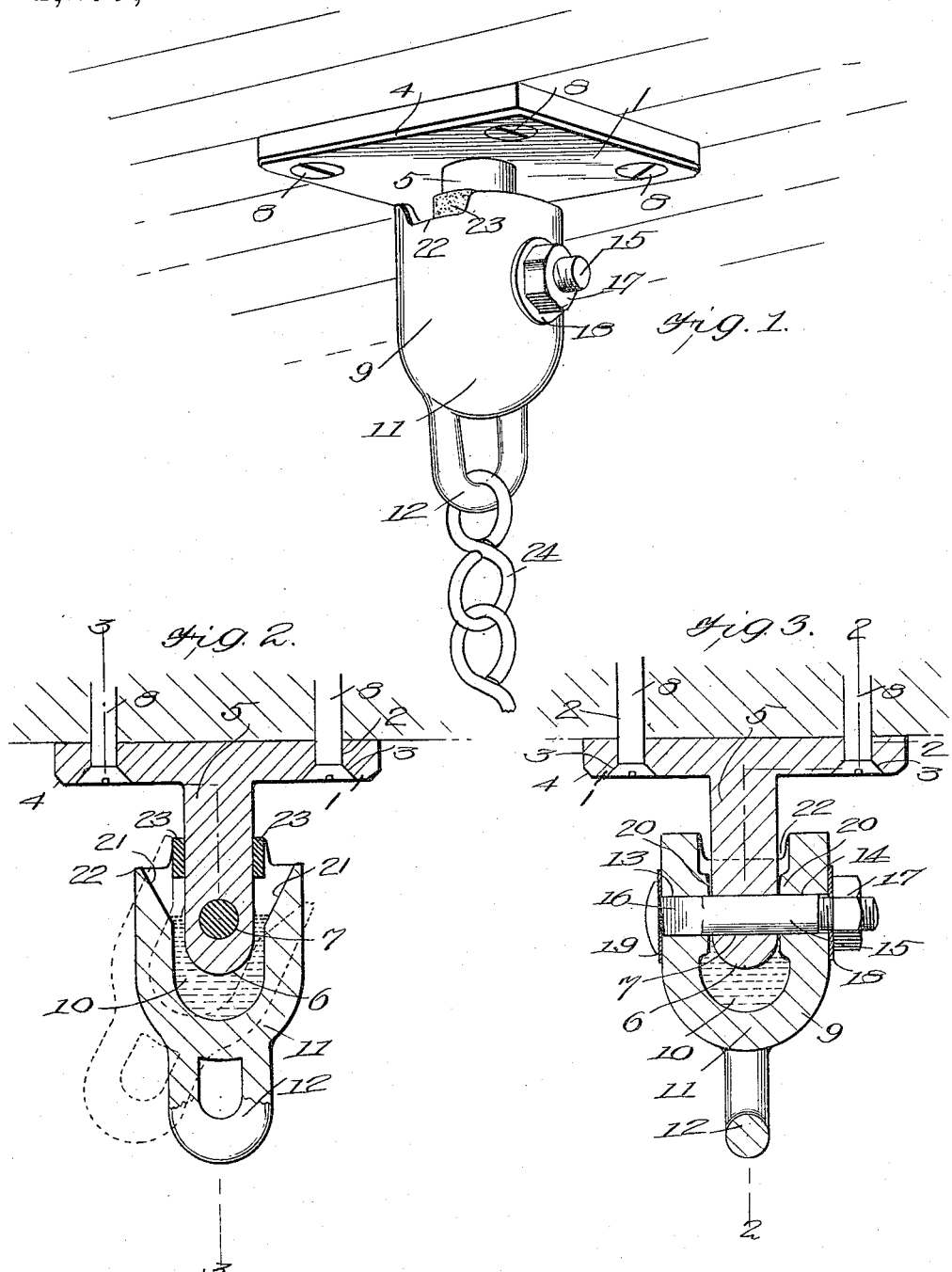

WALTER J. BLACK, OF ATLANTA, GEORGIA.

HANGER FOR SWINGS AND HAMMOCKS.

1,175,689. Specification of Letters Patent. Patented Mar. 14, 1916.

Application filed September 17, 1913. Serial No. 790,194.

*To all whom it may concern:*

Be it known that I, WALTER J. BLACK, a citizen of the United States, and a resident of Atlanta, in the county of Fulton and State of Georgia, have invented a new and useful Improvement in Hangers for Swings and Hammocks, of which the following is a specification.

My invention is an improvement in hangers for swings, hammocks, and the like, and has for its object to provide a hanger of the character specified, consisting of two portions connected in such manner that one of the said portions may be firmly and rigidly secured to a ceiling or the like fixed support, and the other being adapted for connection with the article to be supported, the two portions being connected in such a manner that the last-named portion may swing with respect to the first-named portion in opposite directions and in the same plane, within limits, and wherein the connection is so arranged that the action will be noiseless during the swinging movement.

In the drawings:—Figure 1 is a perspective view of the hanger in use, Fig. 2 is a section on the line 2—2 of Fig. 1, and Fig. 3 is a section on the line 3—3 of Fig. 2.

The present embodiment of the invention comprises an upper portion or section consisting of a plate 1 of suitable material and of suitable size, and provided at each of its corners with a transverse opening 2, each of the said openings being reamed or countersunk at its outer end as indicated at 3. The edges of the plate are also beveled on the outer face of the plate as indicated at 4, to provide a more pleasing construction. The said plate is provided at its center with a lug or pin 5, extending perpendicularly from the face of the plate, and the lower end of the pin or lug is rounded as shown at 6, while the said lug is provided with a transverse opening 7, near its lower end.

The upper portion or section is secured to a ceiling or other fixed support, by means of four screws 8, the said screws passing through the openings 2 and into the material of the support, and the head of the screws are received in the countersunk portions 3 of the openings so that the faces of the said heads are flush with the lower face of the plate.

The upper portion of the hanger is thus rigidly and securely connected with the fixed support in such manner that it cannot become loosened nor can it be torn from the said support under ordinary conditions. The arrangement of the screws, one at each corner of the plate, enables the support to resist strain in every direction.

The lower member or section consists of a casing or socket 9, the said casing being approximately cylindrical, and the chamber 10 of the said socket or casing opens at the upper end of the said casing. The lower end is rounded as shown at 11, and the said casing or socket is provided with a loop or eye 12 at the said end, the loop or eye being integral with the casing.

The casing or socket is also provided with openings 13 and 14 in its side wall, the said openings being in alinement, and the opening 13 is square in cross section. The openings 13 and 14 are adapted to register or aline with the openings 7 of the pin, and a bolt 15 is passed through the registering openings.

A portion of the bolt adjacent to the head is square in cross section, as shown at 16, to fit the opening 13, and the opposite end of the bolt is reduced and screw threaded for engagement by a nut 17.

A washer 18 is preferably arranged between the nut and the face of the casing or socket, and the said bolt hinges the socket or casing to the pin or lug. A washer 19 is also arranged on the bolt, between the head and the adjacent surface of the casing, the opening through the washer being circular or square, as may be desired.

It will be noted from an inspection of Fig. 3, that the casing or socket is provided on its inner face at each of the openings 13 and 14 with an enlargement or boss 20, the said enlargements or bosses lightly engaging the lug or pin at opposite points, to prevent lateral movement of the pin or the casing with respect to the bolt.

The chamber 10 of the casing is also enlarged or reamed on opposite sides and at its upper end, as indicated at 21, the said enlargements being diametrically opposite each other, and a line passing through the centers of the said enlargements will be at right angles to a line passing through the bosses 20.

The bottom wall of the enlargements is inclined as shown, and the purpose of the said enlargements is to permit the socket or casing to swing with respect to the pin or lug a greater distance than would be the case were the enlargements not provided.

At each enlargement, the upper end of the casing or socket is cut away or recessed, as shown at 22, the width of each of the said cut away portions or recesses being slightly greater than the diameter of the lug or pin as shown in Fig. 3, and the said recesses or cut away portions are provided for the same purpose as the enlargements 21.

The pin or lug 5 is provided on opposite faces and at each of the enlargements 21, with a cushion 23, of suitable material, as for instance rubber or felt, and the said cushions are provided for cushioning the swinging movement of the socket at each end of the said movement. The cushions will engage the inclined walls of the enlargements 21, as indicated in dotted lines in Fig. 2 at the end of the swinging movement of the socket in each direction.

The article to be supported, as for instance, a hammock, may be connected to the socket or casing by means of a flexible member, as for instance, a chain 24 or the like, one end of the chain being engaged with the loop 12, while the other end will be engaged with one of the ropes of the swing or hammock. It will be understood that for supporting a swing, two of the improved hangers would be used, the said hangers being spaced apart from each other at the proper distance. For a hammock, either one or two of the hangers may be used, as desired.

The chamber 10 is filled with oil or glycerin, as may be desired, as shown in Figs. 2 and 3, the level of the liquid being at approximately the center of the bolt 15. The liquid in the chamber assists in cushioning the swinging movement of the socket and also lubricates the parts and makes the action noiseless.

It will be noticed from an inspection of Figs. 2 and 3 that the bottom of the chamber 10 is below the lower end of the lug 5, so that there is considerable space below the end of the lug for receiving the liquid.

The oil thoroughly lubricates the bolt, and the bearing surfaces of the bosses and the lug, thus materially reducing the wear of the parts, in addition to making their action noiseless. The oil may be introduced from the upper end of the chamber, and it will be noted that there is sufficient space at each of the enlargements 21 for the introduction of the oil.

The connection between the lug and the socket being a transverse bolt, constrains the socket to swing in the same vertical plane. The provision of the square opening 13 and the squared portion of the bolt prevents turning of the bolt during the placing or removal of the nut and also prevents turning of the said bolt during the swinging of the socket.

The only wear on the bolt is in the opening of the lug, and this bearing is thoroughly lubricated by the oil in the chamber. The washers 18 and 19 prevent any seeping of the oil through the openings 13 and 14. The four point connection between the upper portion of the hanger and the fixed support provides an exceedingly strong connection sufficiently strong to support any reasonable weight that may be brought upon the hanger.

It will be noted from an inspection of Fig. 2, that the chamber is of a cross section sufficiently greater than the cross section of the lug to prevent the lug engaging the chamber wall during the swinging movement of the socket.

The connection between the lug and the socket is not a ball and socket or universal joint, the said connection permitting movement only in a single vertical plane.

I claim:—

1. A hanger of the character specified, comprising a pin having at one end a base, a casing for receiving the free end of the pin and adapted to contain a lubricant, said casing and pin having registering openings diametrically of the pin, a bolt passing through the openings for pivotally connecting the casing to the pin, said casing having inwardly extending bosses encircling the opening and engaging the opposite faces of the pin around the diametrical opening, the opening of the casing being enlarged at opposite sides of the bolt to permit a free swinging of the casing on the pin, said casing having at its lower closed end an eye, and a cushion encircling the pin for engaging the casing.

2. A hanger of the character specified, comprising a pin having at one end a base, a casing for receiving the pin and adapted to contain a lubricant, said casing and pin having registering openings diametrical to the pin, a bolt passing through the openings for pivotally connecting the casing to the pin, said casing having inwardly extending bosses encircling the openings and engaging the opposite faces of the pin around the diametrical opening, the opening of the socket being enlarged transverse to the bolt, and said casing having at its lower end an eye.

WALTER J. BLACK.

Witnesses:
G. W. MILLICAN,
C. M. ZATTAU.

Copies of this patent may be obtained for five cents each, by addressing the "Commissioner of Patents, Washington, D. C."